(12) United States Patent
Mosier

(10) Patent No.: US 6,574,030 B1
(45) Date of Patent: Jun. 3, 2003

(54) MULTI-MODE DISPLAY USING AN ELECTRONICALLY CONTROLLED MIRROR

(75) Inventor: Donald E. Mosier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 228 days.

(21) Appl. No.: 09/861,310

(22) Filed: May 18, 2001

(51) Int. Cl.[7] ............................ G02F 1/153; G02F 1/29; G02B 26/00; G03B 21/00; G09F 3/14
(52) U.S. Cl. .................. 359/267; 359/291; 359/619; 359/627; 359/634; 359/320; 353/31; 353/94; 345/46; 345/83; 348/742; 348/751; 349/8; 349/97; 340/825.69
(58) Field of Search ........................ 359/237, 291, 359/495, 619, 618, 630, 627, 634, 267, 320, 275; 353/31, 33, 84, 94; 345/46, 83; 348/742, 751, 771; 349/8, 97, 9; 340/825.69

(56) References Cited

U.S. PATENT DOCUMENTS

| | | | | |
|---|---|---|---|---|
| 5,231,432 A | * | 7/1993 | Glenn | 353/31 |
| 5,504,478 A | * | 4/1996 | Knapp | 340/825.69 |
| 5,632,545 A | * | 5/1997 | Kikinis | 353/31 |
| 5,779,334 A | * | 7/1998 | Kikinis | 353/31 |
| 6,224,216 B1 | * | 5/2001 | Parker et al. | 353/31 |
| 6,411,424 B1 | * | 6/2002 | Raj | 359/291 |
| 6,490,017 B1 | * | 12/2002 | Huang et al. | 349/97 |

* cited by examiner

*Primary Examiner*—Loha Ben
(74) *Attorney, Agent, or Firm*—Nathan O. Jensen; Kyle Eppele

(57) ABSTRACT

A display includes a light source and a filter positioned to receive light from the light source. An electronically controlled mirror can direct light through the filter in a first mode of operation and not through the filter in a second mode of operation. The display can be utilized in an avionics display system with night vision equipment. The electronically controlled mirror can be a reversible electrochemical mirror (REM).

16 Claims, 3 Drawing Sheets

MULTI-MODE DISPLAY USING AN ELECTRONICALLY CONTROLLED MIRROR

FIELD OF THE INVENTION

The present specification relates generally to the field of displays. More particularly, the present specification relates to a method of and an apparatus for achieving two or more modes in a visual display.

BACKGROUND OF THE INVENTION

In general, it is desirous to utilize filters in display technology to attenuate or accentuate particular types of electromagnetic radiation. For example, certain displays and visual equipment may desire to accentuate particular colors in the visible light spectrum and attenuate other colors in the non-visible and the visible light spectrum. Accordingly, these displays can utilize filters to provide accentuation and attenuation.

In one particular exemplary application, filters are utilized to adjust the dimming range of a backlight system in the display. In this way, filters are employed to selectively attenuate the lighting provided from the display. The attenuation serves to increase the visibility of information provided on the display over a variety of lighting conditions.

In another particular exemplary application, displays and other equipment utilized in military, sports and transportation activities are often employed in tandem with night vision equipment. These displays and equipment conventionally utilize a filter to accommodate the night vision equipment. Issues related to the use of displays and night vision equipment are described below with reference to an aviation application, although the below-mentioned issues are relevant to any applications of displays requiring attenuation or accentuation.

Certain aviation displays are color displays that are utilized with night vision imaging systems (NVIS). These displays provide visual information to captains, pilots, and drivers of ships, aircraft, and vehicles. The user of the color display often wears NVIS goggles at the same time he or she observes information from the color display.

Conventional NVIS goggles are sensitive to light in the infrared, near infrared and visible red spectrum (wavelengths of light). NVIS goggles are typically sensitive to light between 600 nm and 950 nm wavelengths. Although the NVIS goggles allow the pilot or person wearing the goggles to see objects which cannot ordinarily be seen by the naked eye, the goggles emit bright light (e.g., bloom effect) to the pilot's eyes if the goggles are exposed to broadband emissions. Accordingly, if avionic displays emit infrared, near infrared and sometimes even visible red light, the pilot's vision through the goggles is impaired when he or she views flight instrumentation provided on such avionic displays.

The bloom effect is undesirable for several reasons. First, the bloom effect prevents the wearer from seeing anything during the period in which the goggles emit the bright light. Second, when the goggles emit the bright light, the pilot's eyes lose their night adaptation (e.g., night vision). Restoring night adaptation can take several minutes. Third, the night vision goggles may require a certain amount of time to be reset after a bloom effect event. Accordingly, the bloom effect is undesirable when operating a vehicle or aircraft in night vision conditions.

Conventional avionic displays designed to be utilized with NVIS equipment generally are restricted to a narrow emission, such as, single color (e.g., green) displays. The narrow emission is chosen so that it does not interfere with NVIS equipment. However, the restriction to the narrow emission significantly reduces the readability of information and the symbology provided on the displays. Further, it is difficult to highlight and differentiate large amounts of information on the display if the display is restricted to a single color.

Other conventional avionic systems have included color displays that include an NVIS filter. The color display operates in two modes, an NVIS mode (e.g., low luminance) and a daylight mode (e.g., full color capability). Each mode utilizes a distinct light path. The NVIS filter is provided between a light source used in the NVIS mode and an optical shutter, such as a liquid crystal display. The filter prevents emissions that cause NVIS equipment to bloom.

In the daylight mode, the displays use a second light source to provide light directly through the optical shutter without traversing the filter. The second light source is positioned so that its light is not provided through the NVIS filter.

The use of two light sources and two distinct light paths is expensive and adds to the overall size of the display. Each light path often requires duplicative components. Light sources, particularly avionic light sources, are expensive.

Thus, there is a need for a multi-mode display system that does not require multiple light sources. Further, there is a need for a display system which utilizes an integrated light path. Further still, there is a need for a compact display system which can utilize an NVIS or other filter. Further still, there is a need for an avionic display which requires a single light source for daytime and NVIS operation.

SUMMARY OF THE INVENTION

An exemplary embodiment relates to a display. The display includes a light source. The display comprises an electronically controlled mirror and a filter. The display provides light through the filter when the electronically controlled mirror is in a first mode. The light from the display is not provided through the filter when the electronically controlled mirror is in a second mode.

Another exemplary embodiment relates to an avionic display system. The avionic display system includes a light source, a filter and an electronically controlled mirror. The filter is positioned to receive light from the light source when the electronically controlled mirror is in a first mode. The electronically controlled mirror prevents light from reaching the filter in a second mode of operation.

Yet another exemplary embodiment relates to a method of operating a display system. The display system includes a light source and a filter. The method includes providing light from a light source in a first path including the filter when an electronically controlled mirror is in a first mode of operation, and providing the light from the light source in a second path not including the filter when the electronically controlled mirror is in a second mode of operation.

Yet another exemplary embodiment relates to an avionic display system. The avionic display system includes a light source. The avionic display system includes a means for providing a visual image, means for filtering light to attenuate at least a portion of the light associated with the visual image, and means for directing light from the light source. The means for directing directs the light through the means for filtering in a first mode of operation and directs the light to the means for providing a visual image without passing through the means for filtering in a second mode of operation.

BRIEF DESCRIPTION OF THE DRAWINGS

Preferred exemplary embodiments are hereinafter described with reference to the accompanying drawings, wherein like numerals denote like elements, and.

DETAILED DESCRIPTION OF THE PREFERRED EMBODIMENTS

Figure 1:
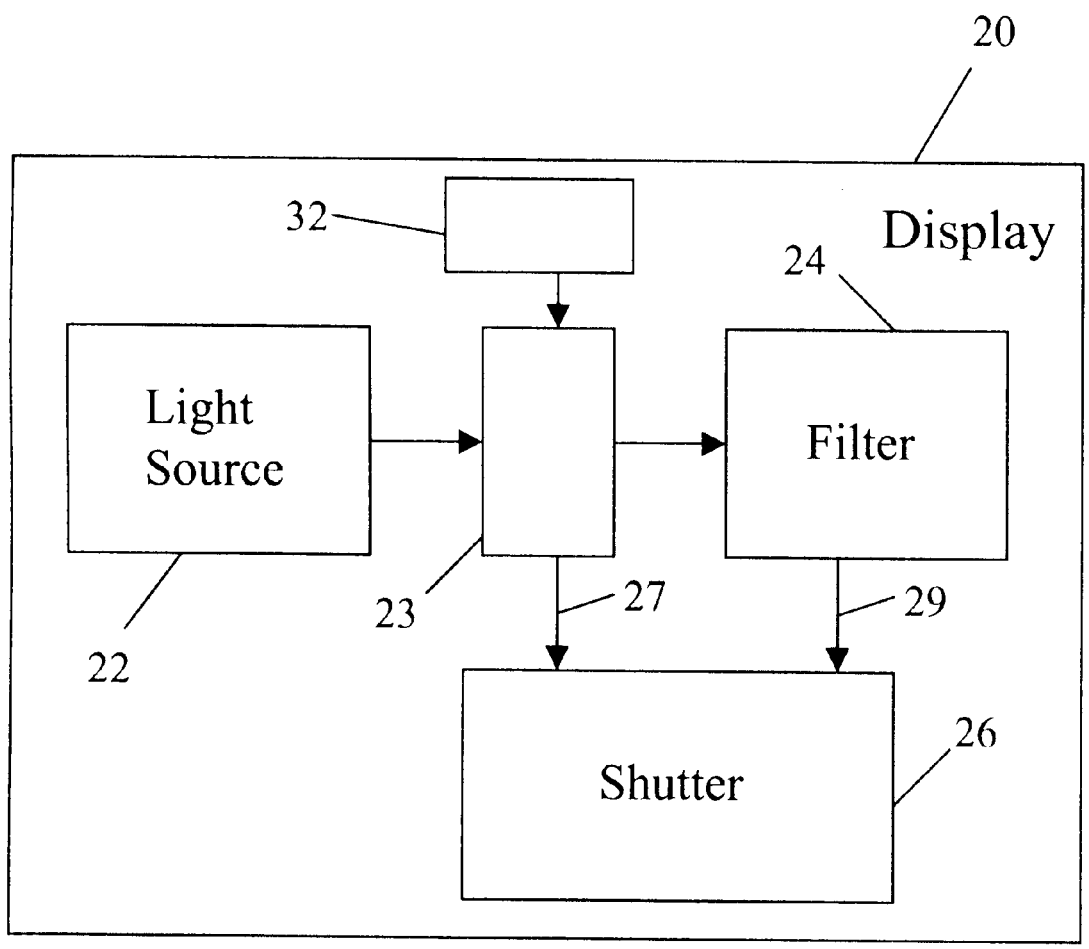
FIG. 1 is a schematic general block diagram of a display system including a filter and an electronically controlled mirror in accordance with an exemplary embodiment.

With reference to FIG. 1, an exemplary display system 20 includes a light source 22, an electronically controlled mirror 23, a filter 24, and an optical shutter 26. Display system 20 can be utilized in any type of application involving the presentation of visual information. Display system 20 can be utilized in military, transportation, communication, or sporting applications where it is desirous to accentuate or attenuate electromagnetic radiation at particular frequencies.

System 20 can be configured to use a single light source (light source 22) and yet achieve multiple modes (two or more modes) of operation. In a preferred embodiment, the light from source 22 is directed through two compact light paths 27 and 29 to achieve multiple (two or more) modes of operation. Alternatively, additional filters and mirrors similar to filter 24 and mirror 23 can be utilized to direct light to more light paths. For example, with an additional mirror and an additional filter, a four mode display system 20 can be achieved.

Display system 20 can be an avionic display, such as a primary flight display, a radar display, or a targeting display. Display system 20 can also be a display utilized in military applications, communication applications, or other visual systems where a filter is necessary.

Light source 22 can be any device for generating light, such as, an LED, an LED array, an incandescent light, a fluorescent light or other light generator for display system 20. Light source 22 can include super-bright LEDs. In one embodiment, light source 22 can be a single light source comprised of an array of LEDs.

Filter 24 can be any type of filter which has a response characteristic at particular wavelengths. For example, filter 24 can provide filtering in any visible frequency range or in an infrared frequency range. Filter 24 can have a fixed frequency response.

Filter 24 can provide accentuation or attenuation in various frequency ranges. Although a preferred embodiment is described with respect to an infra-red frequency range, any frequency range can be applicable to the principles described below. According to a preferred embodiment, filter 24 is a high pass filter configured to significantly attenuate radiation above a wavelength of about 610 nm. Alternatively, filter 24 can operate as a band pass filter configured to attenuate all wavelengths except a wavelength range of about 450 nm through about 601 nm. The type of filter utilized in system 20 is not described in a limiting fashion.

Shutter 26 can be any type of device for generating an image from light provided from light source 22 and adjustable filter 24. In one embodiment, shutter 26 can create variable images. Shutter 26 can be a liquid crystal display (LCD), one or more components comprising a part of an LCD (such as a liquid crystal matrix and polarizers), or any other device for creating images.

In another embodiment, light source 22 and shutter 26 can be replaced by a cathode ray tube (CRT), an LED display, or other displays including an internal light source. In such an embodiment, filter 24 and electronically controlled mirror 23 can be provided in front of the CRT, LED display, or other displays including the internal light source.

In operation, system 20 can operate in at least a first mode of operation and a second mode of operation. In a first mode of operation, light from light source 22 is reflected by mirror 23 to reach shutter 26 via path 27. In the second mode of operation, mirror 23 allows light to reach filter 24 and light is provided to shutter 26 via path 29.

Preferably, light travels either by path 27 or path 29. Although particular reflections and light pathways are shown, system 20 can alternatively be configured such that mirror 23 is utilized to reflect light from source 22 to filter 24 instead of providing a direct light path between source 22 and filter 24. The particular configuration shown in FIG. 1 is not shown in a limiting fashion.

In one exemplary embodiment, electronically controlled mirror 23 is a reversible electrochemical mirror (REM). The REM operates through a controlled plating of reflective metal onto a glass surface. A metallic compound is maintained in solution between two glass plates. With the application of a specific control current, the metal is plated onto the surface of one of the two glass plates, thereby creating a highly reflective mirror. With the application of a second control current, the metal is returned into a solution, which eliminates the reflective properties of the mirror, and allows light to pass through the REM. With intermediate control currents, varying levels of reflection and transmission are provided. Mirror 23 can be constructed of multiple layers of glass covered by metal layers. The metal layers are responsive to current flow therethrough, thereby selectively providing a reflective or transmissive property for mirror 23.

Alternatively, mirror 23 can be a conventional mirror positioned by a motor to provide the appropriate reflection. However, a solid state mirror controlled by an electronic signal is preferred when space is a significant design criteria. In another alternative, an LCD medium that is reflective or absorptive in response to an electronic signal could be utilized for mirror 23.

Electronically controlled mirror 23 can respond to an electronic control signal from a control circuit 32. Control circuit 32 can provide the electronic signal in response to a light sensor which determines ambient conditions, a user interface such as a switch or dial which receives manual inputs from a computer or other device.

Figure 2:
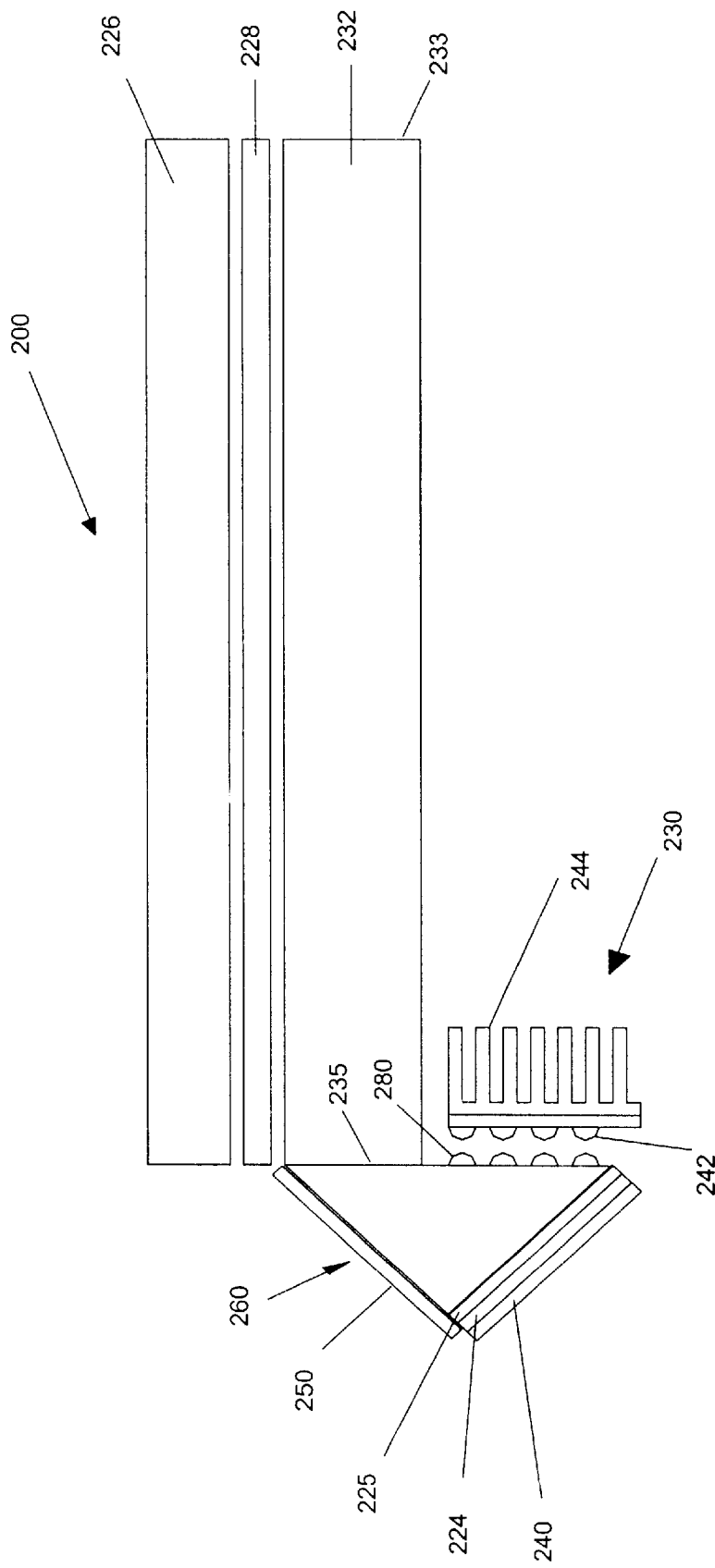
FIG. 2 is a more detailed schematic general block diagram of an avionic display including an NVIS filter and an electronically controlled mirror contained in a prism structure in accordance with another exemplary embodiment.

With reference to FIG. 2, a particular type of display system 20 (FIG. 1) is embodied as an avionic display system 200. System 200 can be part of a flight control computer, a weather screen, a radar screen, a heads up display (HUD), a traffic collision avoidance system (TCAS), etc.

Avionic display system 200 includes an optical shutter or liquid crystal display (LCD) 226, a diffuser 228, a light guide 232, an electronically controlled mirror 225, and a filter 224. System 200 also includes a light source 230, a fixed mirror 240, and a fixed mirror 250. System 200 is preferably embodied as a color display compatible with NVIS goggles.

System 200 is preferably configured to be operated in a night vision mode (NVIS mode) and a non-night vision mode (daytime mode). Light is provided from light source 230 and reflected directly off of mirror 225 and mirror 250 through light guide 232 and diffuser 228 to LCD 226 in a non-NVIS mode. In the NVIS mode, light is provided from light source 230 through mirror 225 and filter 224. The light is reflected off of mirror 240 and mirror 250 to light guide 232, through diffuser 228 to LCD 226.

Light source 230 can be one or more fluorescent tubes, or arrays of LEDs. Light source 230 can be a light emitting diode (LED) array 242 mounted with a heat sink package 244.

Array 242 can include a string matrix of LEDs, such as, high brightness LEDs in a variety of colors. Filter 224 can be an NVIS filter or a color filter, such as a red, green or blue filter. Light source 230 is preferably bright enough for both daytime and NVIS modes.

A prism structure 260 supports electronically controlled mirror 225, filter 224, mirror 240 and mirror 250. Alternatively, prism structure 260 can be replaced by a telescope prism in which internal critical angle reflectance replaces mirror 250. Prism structure 260 includes a filtered optical path and a non-filtered optical path. In the daytime or non-NVIS mode, light from source 230 is reflected from mirror 225 to mirror 250 (non-filtered) to form the non-filtered path. In the NVIS mode, electronically controlled mirror 225 allows light to pass through filter 224 to mirror 240 and from mirror 240 through filter 224 to mirror 250 to form the filtered path.

Filter 224 can be relatively thin because light travels through it twice in the NVIS mode. An internal portion of prism structure 260 can be glass, air or other optically transparent medium for allowing light to travel to light guide 232.

Filter 224 can be a night vision filter or NVIS filter. Filter 224 can be manufactured by ZC&R or WamCo. Filter 224 is fixedly supported on prism structure 260.

Alternatively, filter 224 can be an absorptive filter or a multilayer interference filter designed to provide a very steep roll-off or cutoff frequency with high transmission in the blue and green wavelengths and low or no transmission of longer infrared wavelengths. Filter 224 can provide various attenuation and accentuation characteristics for display system 200.

In one alternative embodiment, filter 224 can be a neutral density filter to increase the dynamic range of backlight dimming associated with display 200. Filter 224 can also be a color filter that allows electrical tuning of backlight chromaticity. For example, if LED array or light source 230 emits light that is slightly cyan in color, filter 224 can be tuned to attenuate green and blue light so that chromaticity of light provided through display system 200 can be controlled along a threshold between cyan and red.

According to an alternative structure, system 200 can include a prism structure on an end 233 of light guide 232.

End 233 is opposite an end 235 of light guide 232. The structure on end 233 can include a light source using LEDs or tubes providing a slightly yellow colored emitter and a filter tuned to attenuate red and green. The total backlight luminance from the prism structure on end 233 and prism structure 260 on end 235 can provide tuning over a large portion of color space for the backlight luminance of display system 200. In this alternative system, real time color balance adjustment could be achieved without the use of display gray scales.

In addition, system 200 advantageously locates light source 230 near edge 235 of system 200, thereby facilitating cooling via heat sink 244. Filter 224 can be kept small with such a configuration, thereby reducing cost.

System 200 also employs a microlens arrangement or light collimating optical system 280 on prism structure 260. System 280 converts the diverging light beam from LED array 242 and converts it into a more planar or non-diverging light beam that is better managed within the constraints of the reflections associated with prism structure 260.

Figure 3:
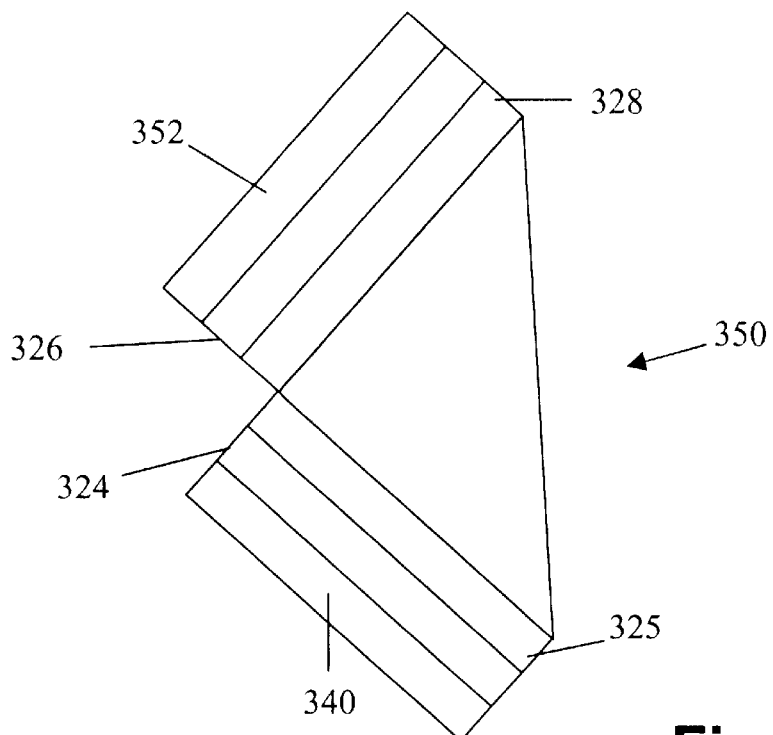
FIG. 3 is a more detailed schematic general block diagram of an alternative prism structure for the avionic display illustrated in FIG. 2 in accordance with still another exemplary embodiment.

With reference to FIG. 3, a prism structure 350 is shown. Prism structure 350 can replace prism structure 260 (FIG. 2) or be disposed on end 233 of system 200. Prism structure 350 includes an electronically controlled mirror 325 similar to mirror 225 and an electronically controlled mirror 328 similar to mirror 225.

Prism structure 350 also includes filters 324 and 326 similar to filter 224. Prism structure 350 also includes a mirror 340 similar to mirror 240 and a mirror 352 similar to mirror 250. Prism structure 350 can also include collimating optical components.

Prism structure 350 allows display system 200 to achieve four modes of operation. The four modes of operation are achieved by controlling the reflective states of mirrors 325 and 328.

In a first mode of operation, electronically controlled mirrors 325 and 328 are reflective and neither filter 324 nor 326 is in the light path through system 200. Light reflects off of mirrors 325 and 328 and exits prism structure 350. Light is not filtered by filter 324 or 326 in this mode.

In a second mode of operation, electronically controlled mirror 325 is not reflective and mirror 328 is reflective. Light travels through filter 324 to mirror 340. The light from mirror 340 travels through filter 324 and is reflected off electronically controlled mirror 328 to exit structure 350. In this mode, light is only filtered by filter 324.

In a third mode of operation, electronically controlled mirror 325 is reflective and electronically controlled mirror 328 is non-reflective. Light is reflected off of mirror 325 and travels through mirror 328 and filter 326. The light is reflected off of mirror 352, through filter 326, and exists structure 350. In this mode, light is filtered only by filter 326.

In a fourth mode of operation, both of electronically controlled mirrors 325 and 328 are non-reflective. Light travels through electronically controlled mirror 325 to filter 324 and mirror 340. The light is reflected by mirror 340, through filter 324 to mirror 328. The light then travels through mirror 328 to filter 326 and mirror 352. Light is reflected from mirror 352, travels through filter 326 and exits prism structure 350. In this mode, light is filtered by both filters 324 and 326.

Figure 4:
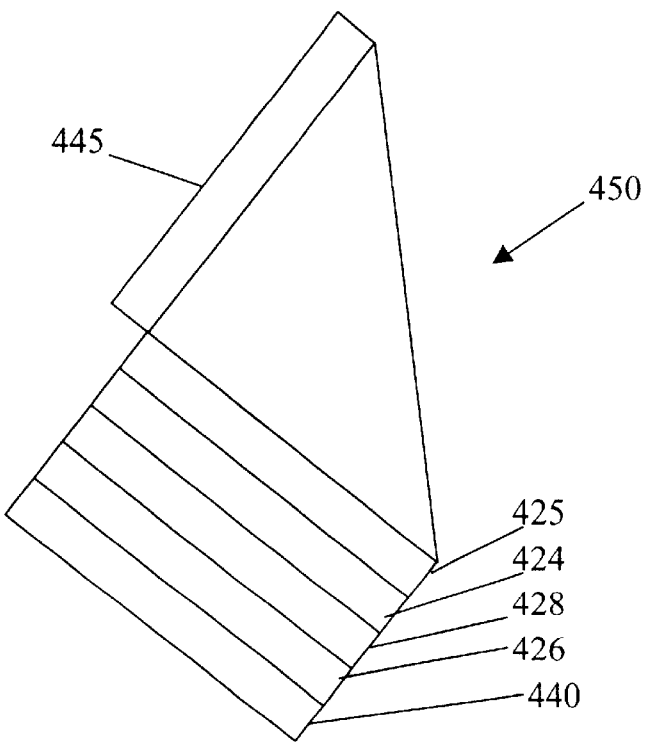
FIG. 4 is a more detailed schematic general block diagram of an alternative prism structure for the avionic display illustrated in FIG. 2 in accordance with yet another exemplary embodiment.

With reference to FIG. 4, a prism structure 450 can be utilized in place of prism structure 250 (FIG. 2) or on end 233. Prism structure 450 is similar to prism structure 350 and allows system 200 to achieve at least three modes of operation.

Prism structure 450 includes an electronically controlled mirror 425, an electronically controlled mirror 428, a filter 424, a filter 426, a mirror 440, and a mirror 445. Mirrors 425 and 428 are similar to mirror 225 (FIG. 2). Mirrors 440 and 445 are similar to mirrors 240 and 250, respectively.

Filters 424 and 426 are similar to filter 224. Filter 424 can be an NVIS filter and filter 426 can be a filter for emphasizing or amplifying light at red wavelengths. Emphasizing red at night can be important because red colors are harder to see on a display at night.

Prism structure 450 allows system 200 to achieve three modes of operation. In the first mode of operation, light is provided through collimating optics and reflected off of electronically controlled mirror 425 to mirror 445 and is provided to light guide 232. In this mode, light is not filtered by either filter 424 or 426.

In a second mode, light is provided through mirror 425 and filter 424 and reflected off of mirror 428 to mirror 445. Light is reflected from mirror 445 to light guide 232. In this mode, light is filtered by filter 424.

In a third mode of operation, light is provided through mirror 425 and filter 424 and through mirror 428 and filter 426. Light is reflected from mirror 440 to mirror 445. Light is reflected from mirror 445 to light guide 232. In this mode, light is filtered by both filter 424 and filter 426.

Additional stacks of filters can be utilized to achieve more modes. For example, prism structure 450 can be provided on both ends 235 and 232 or prism structure 350 can also be provided on both ends 235 and 232. Alternatively, prism structure 350 can be provided on end 235 and prism structure 450 can be provided on end 232.

It is understood that while preferred embodiments and specific examples are given, they are for the purpose of illustration only and are not limited to the precise details disclosed. For example, although specific wavelengths of light are discussed, other types of light can be utilized. Various cutoff characteristics can be achieved. Further, although avionic display systems are discussed, other display systems requiring adjustable filters can utilize the principles of the present invention. Still further, the actual physical dimensions of the components of the invention may be different from what is depicted in the Figures, it being understood that the Figures have been drawn to aid in understanding the invention. Various modifications may be made in the details within the scope and range of equivalents of the claims without departing from what is claimed.

What is claimed is:

1. A display including a light source, the display comprising:
   an electronically controlled mirror; and
   a filter, wherein the display provides light through the filter when the electronically controlled mirror is in a first mode, and wherein the light from the display is not provided through the filter when the electronically controlled mirror is in a second mode.

2. The display of claim 1, wherein the filter is an NVIS filter and the wavelength characteristic of the filter attenuates light in the infrared range.

3. The display of claim 1, wherein the electronically controlled mirror is a reversible electro-chemical mirror.

4. The display of claim 1, further comprising:
   a second filter and a second electronically controlled mirror, wherein the light from the display is provided through the second mirror in a third mode.

5. The display of claim 4, wherein the light is provided through the electronically controlled mirror and the second electronically controlled mirror in a forth mode.

6. The display of claim 1, wherein the filter is disposed on a back surface of the electronically controlled mirror.

7. An avionic display system comprising:
   a light source;
   a filter; and
   an electronically controlled mirror, wherein the filter is positioned to receive light from the light source when the electronically controlled mirror is in a first mode, wherein the electronically controlled mirror prevents light from reaching the filter in a second mode of operation.

8. The avionic display system of claim 7, wherein the filter is one of an NVIS filter, a green filter, and a blue filter.

9. The avionic display system of claim 7, further comprising:
   a prism structure containing the filter and the electronically controlled mirror.

10. The avionic display system of claim 9, wherein the filter is disposed above a first surface of the prism structure, and the electronically controlled mirror is disposed above the filter.

11. The avionic display system of claim 10, wherein the first surface is a fixed mirror.

12. The avionic display system of claim 7, wherein the electronically controlled mirror is a reversible electrochemical mirror.

13. The avionic display system of claim 12, wherein the display includes at least two filters and at least two electronically controlled mirrors.

14. A method of operating a display system, the display system including a light source and a filter, the method comprising:
   providing light from the light source in a first path including the filter when an electronically controlled mirror is in a first mode of operation; and
   providing the light from the light source in a second path not including the filter when the electronically controlled mirror is in a second mode of operation.

15. The method of claim 14, wherein the first mode and second mode are controlled by a control signal.

16. The method of claim 15, wherein the filter is an NVIS filter.

* * * * *